United States Patent

Kajimura

[11] Patent Number: 5,913,729
[45] Date of Patent: Jun. 22, 1999

[54] METHOD FOR CULTIVATING GARLIC PLANTS

[75] Inventor: Yoshio Kajimura, Osaka, Japan

[73] Assignee: Wakunaga Seiyaku Kabushiki Kaisha, Osaka, Japan

[21] Appl. No.: 08/835,489

[22] Filed: Apr. 8, 1997

[30] Foreign Application Priority Data

Apr. 10, 1996 [JP] Japan .................................. 8-088358

[51] Int. Cl.$^6$ .................................................. A01B 79/00
[52] U.S. Cl. ................................................. 47/58; 800/200
[58] Field of Search ................................. 47/58; 800/200

[56] References Cited

PUBLICATIONS

"A Garlic Testament: Seasons on a Small New Mexico Farm", Stanley Crawford; 1992.
"A Garlic Testament: Seasons on a Small New Mexico Farm", Stanley Crawford; Chapter 6, 1995, Shobun–sha Publisher, Tokyo. (With partial English translation).
"Growing Great Garlic", Ron Engeland; pp. 18–19 and 198–199, Filaree Productions, 1991.
Bulletin of Yamaguta University (Agricultural Science), vol. 8, No. 2, pp. 507–599, 1979, Hideaki Takagi, "Studies on Bulb Formation and Dormancy of Garlic Plants".

*Primary Examiner*—Leon B. Lankford, Jr.
*Attorney, Agent, or Firm*—Oblon, Spivak, McClelland, Maier & Neustadt, P.C.

[57] ABSTRACT

Efficient methods for cultivating garlic plants are disclosed. Bulbils, which are smaller but available in a larger number per plant than cloves, are used in: a first method for cultivating garlic plant, wherein bulbils of a garlic plant are planted in spring for cultivation after stored for wintering at a temperature not inducing fleshy clove formation; a second method of cultivating garlic plants, wherein a garlic plant in which fleshy clove formation may have been induced (e.g., one which has been exposed to a low temperature in winter) is warmed to negate the state of fleshy clove formation, then the bulbils thereof are planted in spring for cultivation; and a third method of cultivating garlic plants, wherein a garlic plant which has been harvested in the Southern Hemisphere and has not wintered is transported to the Northern Hemisphere, and the bulbils thereof are planted in spring for cultivation. According to the methods of the present invention, a garlic plant which has been planted in spring continues vegetative growth without withering its epigeal part during summer when the day length is long, efficiently yielding bulbs comparable to those obtained by conventional cultivation from cloves.

10 Claims, No Drawings

METHOD FOR CULTIVATING GARLIC PLANTS

BACKGROUND OF THE INVENTION

1. Field of the Invention

The present invention relates to an efficient method for cultivating garlic plants by using the bulbils thereof.

2. Background Art

Garlic plants are generally cultivated by planting their cloves, which are part of the bulbs, in autumn, and harvesting in summer next year. However, bulbs are the edible part of garlic plants. In other words, according to this cultivation method, bulbs are used for multiplication as well as for harvest, which is why part of them need to be consumed for seeding.

A garlic bulb generally consists of 5 to 10 cloves. When planted, they will yield only 5 to 10 bulbs the next year. On the other hand, onions, which are the same genus, bear thousands of seeds and, thus, yield thousands of bulbs. This fact proves how inefficient the cultivation of garlic plants is as compared to other plants and, therefore, how important it is to improve the method.

About the induction of fleshy clove formation in garlic plants, it has been known that, when exposed to the low temperature in winter, the plants form and swell fleshy cloves from spring toward summer and produce bulbs in summer.

On the other hand, it has been reported by Takagi, et al., that if cloves which have been stored at room temperature are cultivated at a temperature of 20 to 25° C. and a day length of 16 hours, they maintain vegetative growth for as long as 227 days, and that if cloves which have been stored at a low temperature are warmed, the state of fleshy clove formation disappears (Bulletin of Yamagata University (Agricultural Science), Vol. 8, No. 2, Appendix (1979)).

SUMMARY OF THE INVENTION

The inventor has now found that garlic plants can be very efficiently cultivated by applying the above findings by Takagi, et al., to bulbils, which are smaller but available in a larger number per plant than cloves.

Thus, an object of the present invention is to provide an efficient method of cultivating garlic plants.

The method for cultivating garlic plants according to the present invention may be classified into three.

According to the first aspect of cultivating garlic plants, there is provided a method for cultivating garlic plants, comprising the steps of planting a bulbil of a garlic plant in spring and growing the planted bulbil, wherein the bulbil has been stored for wintering at a temperature not inducing fleshy clove formation in the garlic plant.

According to the second aspect of cultivating garlic plants, there is provided a method for cultivating garlic plants, comprising the steps of warming a garlic plant in which fleshy clove formation may have been induced thereby negating the state of fleshy clove formation, planting a bulbil of the garlic plant in spring and growing the planted bulbil.

According to the third aspect of cultivating garlic plants, there is provided a method for cultivating garlic plants, comprising the steps of transporting to the Northern Hemisphere a garlic plant which has been harvested in the Southern Hemisphere and has not wintered, planting a bulbil of the garlic plant in spring and growing the planted bulbil.

According to the method of the present invention, a garlic plant which has been planted in spring continues vegetative growth without withering its epigeal part during summer when the day length is long, efficiently yielding bulbs comparable to those obtained by conventional cultivation from cloves.

DETAILED DESCRIPTION OF THE INVENTION

Garlic Plants and Bulbils Thereof

According to the present invention, bulbils are used as seeds in place of cloves, which have conventionally been used as seeds for the cultivation of garlic plants. Furthermore, the season of planting is changed from autumn to spring in order to prolong the cultivation period so that bulbs of the size comparable to ones obtained from cloves can be harvested even though the bulbils, which are smaller than cloves, are used as seeds.

The garlic plants to which the present invention applies refer to those which are categorized as *Allium sativum L. formapekinense Hakino* of the Liliaceae family. As bulbils are used in the present invention, a completely bolting cultivar which bears many bulbils is preferred. A fertile cultivar is also acceptable.

Area and Seasons For Cultivation

The method of cultivation according to the present invention may be widely applied in areas with various climatic conditions with different temperatures. It may be implemented in Asian countries including Japan, China, South Korea and Russia; North American countries including Canada and U.S.A.; South American countries including Argentina; Oceanian countries including Australia and New Zealand; and Europe; most preferably in countries with four seasons such as Japan, China, South Korea and U.S.A. In the present invention, four seasons, or spring, summer and winter, shall be defined essentially the same as have been locally and conventionally accepted in the field of garlic plant cultivation. More specifically, spring, summer and winter in Japan, for example, shall correspond mostly to April to August, June to September, and November to April, respectively.

Method of Cultivation

The method of cultivation according to the present invention may be classified into three modes.

First Method

According to the first method of the present invention, a harvested garlic plant is stored for wintering at a temperature not inducing fleshy clove formation.

Garlic plants are harvested generally in summer and planted in the following autumn. Fleshy clove formation is induced when they are exposed to the low temperature in winter, and the fleshy cloves swell from spring to summer.

However, according to the first method of the present invention, a garlic plant harvested in summer is not planted in the following autumn, but stored for wintering. During storage, it is kept from a low temperature atmosphere so as not to induce fleshy clove formation. More specifically, it is stored at room temperature, preferably at 10 to 20° C., for wintering. As a result, fleshy clove formation is not induced while the garlic plant is wintering.

In this method, the wintered garlic plant in which fleshy clove formation is not induced is seeded in the following spring. In the present invention, unlike the conventional method for cultivating garlic plants, bulbils are separated from the garlic plant and seeded. The bulbils continue vegetative growth during the following summer and autumn because fleshy clove formation has not been induced. Then, fleshy clove formation is eventually induced in the following winter, when the plants are exposed to the low temperature. They swell the fleshy cloves in the following spring and summer to yield harvestable bulbs.

This method allows garlic plants to continue vegetative growth for a long period as a result of storage for wintering at a temperature not inducing fleshy clove formation. This enables bulbils to yield bulbs of a comparable size to those grown from cloves although bulbils are smaller than cloves.

Obviously, garlic plants may winter twice or more, provided that they are maintained at the temperature not inducing fleshy clove formation.

Second Method

According to the second method of the present invention, a garlic plant in which fleshy clove formation may have been induced is warmed to negate the state of fleshy clove formation, then the bulbils thereof are seeded.

According to the findings by Takagi, et al., a state of fleshy clove formation which has been induced in a garlic plant can be negated by warming it. The temperature and time for warming in the present mode may be selected from the range sufficient for negating the state of fleshy clove formation. However, in a preferred method of the present invention, warming is implemented by storage at 30 to 35° C. for 10 to 30 days.

In the present method, bulbils are seeded in spring, as in the first method of the present invention. The subsequent procedure for cultivation may be the same as in the first mode.

Third Method

According to the third method of the present invention, a garlic plant which has been harvested in the Southern Hemisphere is used. First, a garlic plant is harvested from spring to summer in the Southern Hemisphere. The harvested garlic plant is transported to the Northern Hemisphere before it is exposed to the low temperature in winter in the Southern Hemisphere. Then, its bulbils are planted in the Northern Hemisphere in spring for cultivation. As the garlic plant has not wintered, fleshy clove formation has not been induced. Therefore, as in the first and second method of the present invention, garlic plants can be cultivated efficiently.

If the garlic plant is transported to the Northern Hemisphere early when the Northern Hemisphere is still in winter, it is stored preferably at a temperature not inducing fleshy clove formation as in the first method of the present invention.

Transplantation

In a preferred embodiment of the present invention, the cultivation of garlic plants according to the present invention is combined with transplantation. In particular, bulbils are not seeded directly in a farm; instead, they are grown for a given time in a different place, preferably in pots, to seedlings, which are then transplanted to a farm. By adopting transplantation, the time necessary for cultivation in the farm can be reduced. Furthermore, seeding and transplantation can easily be mechanized by the use of paper or plastic pots. Thus, the use of bulbils has an advantage of improving the productivity of the cultivation procedure.

EXAMPLES

The present invention is illustrated in more details in, but not limited to, the following examples:

Example 1

(1) Storage

Bulbils of a conventional local cultivar "Furano" were gathered in summer (July), 1993, in Fukagawa City, Hokkaido, Japan. They were dried in a greenhouse from July to October, and stored in an incubator controlled to 17 to 20° C. from November to April next year. A maximum of about 100 bulbils were available per plant.

(2) Seeding

The bulbils which had been stored as described in (1) were seeded in sugar beet pots of paper ,(29×116×13 cm, Nippon Tensai Seito) in May 1994 in Fukagawa City, and grown for 1.5 months in a greenhouse to seedlings of 10 to 20 cm.

(3) Transplantation

The seedlings obtained as described in (2) were transplanted in July 1994 to a farm in Fukagawa City which had been fertilized as usual. Bulbs (50 to 90 g) were harvested in July, 1995.

Example 2

Fertile garlic plants (from Russia) were cultivated as in example 1. Bulbs (40 to 70 g) were harvested in July, 1995.

In the fertile garlic plants, a maximum of 300 bulbils were available per plant.

Example 3

(1) Import

Bulbils were imported from Southern Hemisphere (Argentina) in March, and stored until April in an incubator controlled to 17 to 20° C.

(2) Seeding, and (3) Transplantation

Conducted as in example 1. Bulbs (40 to 70 g) were harvested in July, 1995.

Example 4

(1) Storage

Bulbils of a conventional local cultivar "Furano" were gathered in summer (July), 1993, in Fukagawa City, Hokkaido, Japan. They were dried in a greenhouse from July to October, and stored in an incubator controlled to approximately 4° C. from November to March next year. Then, they were stored in a warm ambiance (30° C. approx.) from March to April (about 1.5 months). A maximum of about 100 bulbils were available per plant.

(2) Seeding

The bulbils which had been stored as described in (1) were seeded in 12 cm PVC pots in May, 1994. Then, they were grown in open air in Fukagawa City, Hokkaido, Japan, from May to July (about 2 months) to seedlings of 10 to 20 cm.

(3) Transplantation

The seedlings obtained as described in (2) were transplanted in July 1994 to a farm in Fukagawa City which had been fertilized as usual. Bulbs (50 to 90 g) were harvested in July, 1995.

What is claimed is:

1. A method for cultivating garlic plants, comprising planting a bulbil of a garlic plant in spring and growing the planted bulbil, wherein the bulbil has been stored for wintering at a temperature not inducing fleshy clove formation in the garlic plant.

2. A method for cultivating garlic plants according to claim 1, wherein the temperature not inducing fleshy clove formation is 10 to 20° C.

3. A method for cultivating garlic plants, comprising warming a garlic plant thereby negating the state of fleshy clove formation, planting a bulbil of the garlic plant in spring and growing the planted bulbil.

4. A method for cultivating garlic plants according to claim 3, wherein the garlic plant is a garlic plant which has been exposed to a low temperature in winter.

5. A method for cultivating garlic plants according to claim 3, wherein the warming step is conducted by maintaining the bulbil of the garlic plant at a temperature of 30 to 35° C. for 10 to 30 days.

6. A method for cultivating garlic plants, comprising transporting to the Northern Hemisphere a garlic plant which has been harvested in the Southern Hemisphere and has not wintered, planting a bulbil of the garlic plant in spring and growing the planted bulbil.

7. A method for cultivating garlic plants according to any one of claims 1 to 6, further comprising harvesting the garlic plants in the next summer.

8. A method for cultivating garlic plants according to any one of claims 1 to 6, wherein the bulbil is grown to seedlings and the seedlings are transplanted to a farm for cultivation.

9. A method for cultivating garlic plants according to claim 1, wherein said garlic plant is a garlic plant of a completely bolting cultivar.

10. A method for cultivating garlic plants according to claim 3, wherein said garlic plant is a garlic plant of a completely bolting cultivar.

* * * * *